Oct. 10, 1933. G. SWIKART 1,929,525
INTERCENTRIC GAUGE
Filed June 20, 1932 2 Sheets-Sheet 1
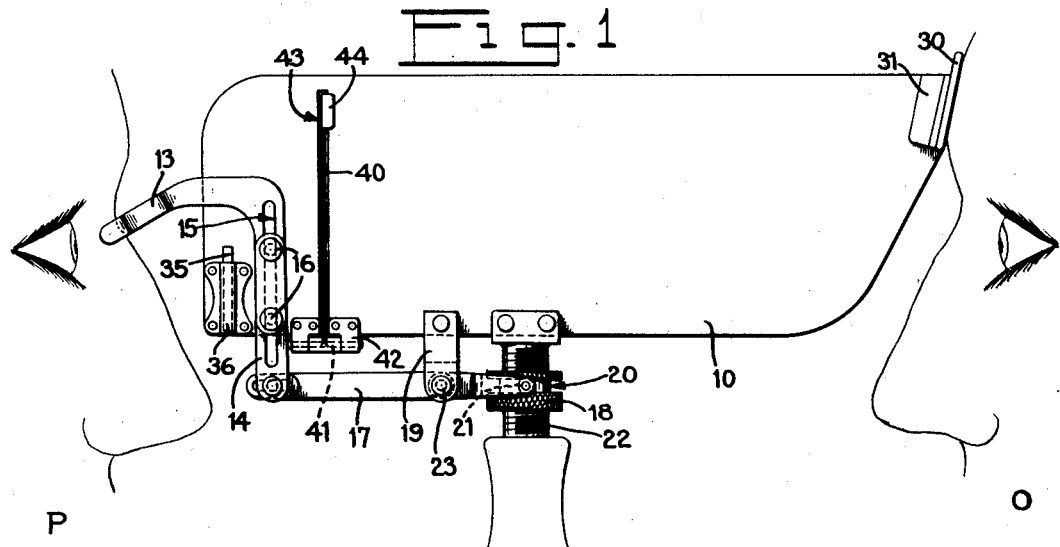
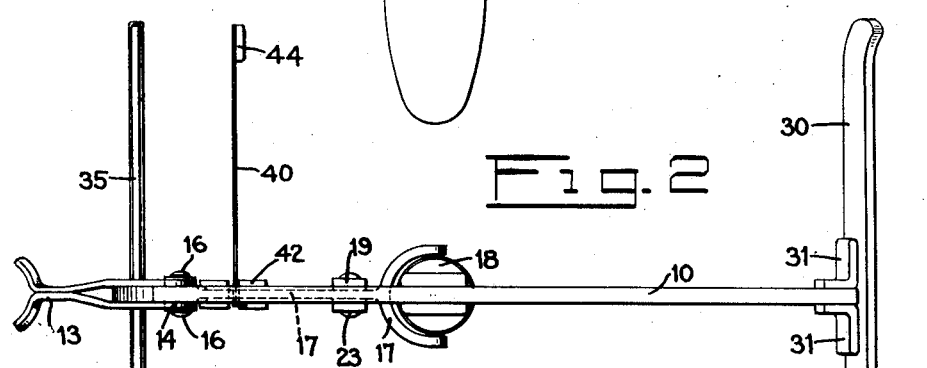
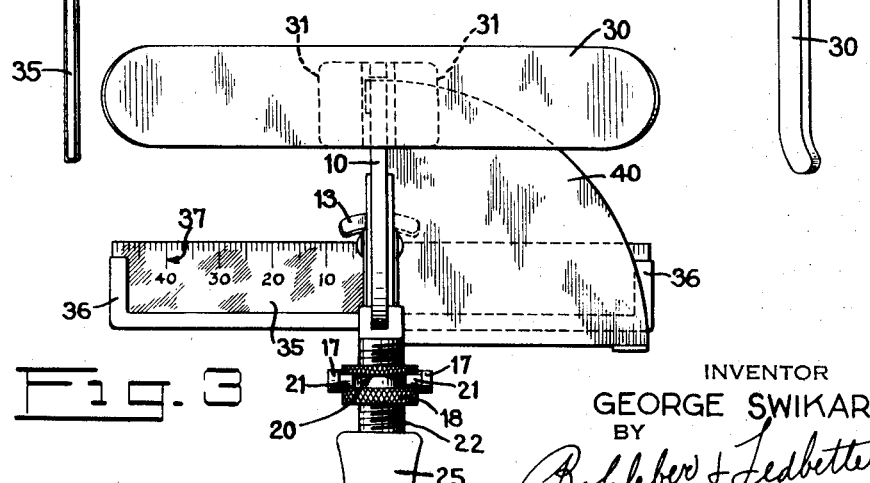
INVENTOR
GEORGE SWIKART
BY
Bohleber Ledbetter
ATTORNEYS Oct. 10, 1933.　　　　G. SWIKART　　　　1,929,525
INTERCENTRIC GAUGE
Filed June 20, 1932　　2 Sheets-Sheet 2
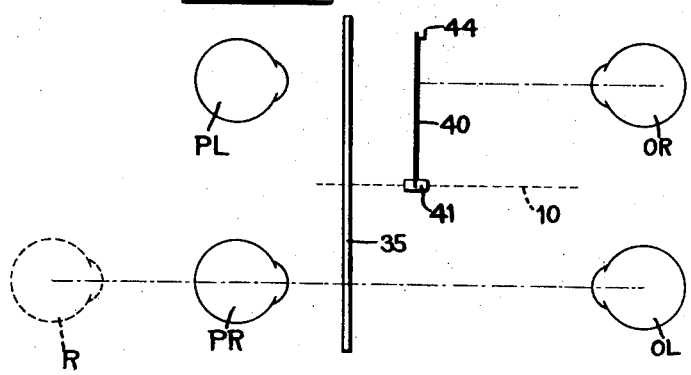
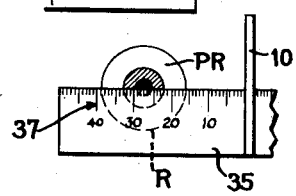
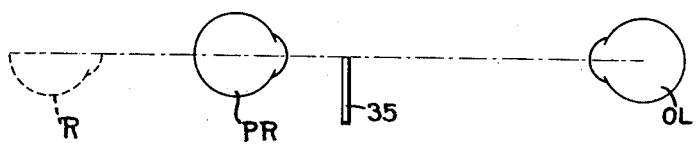
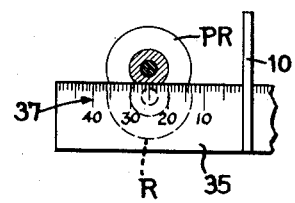
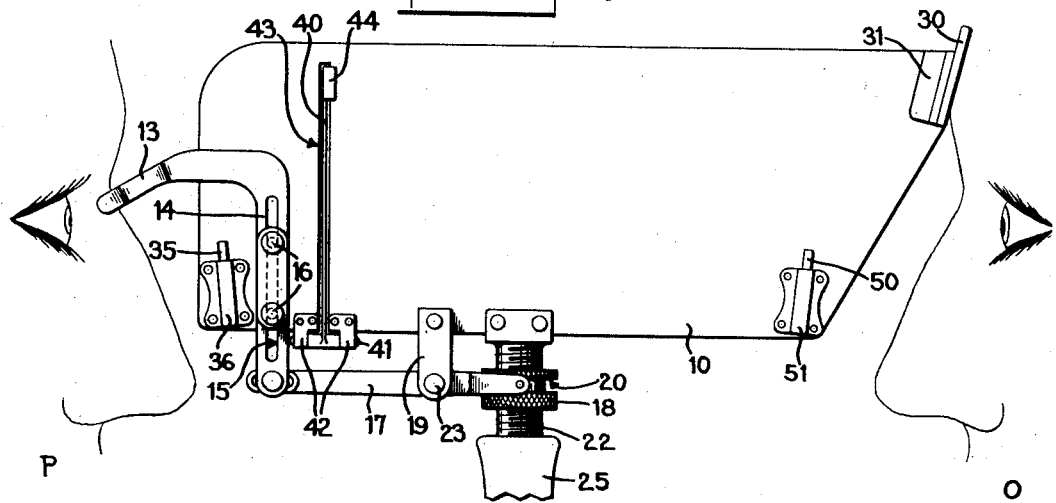
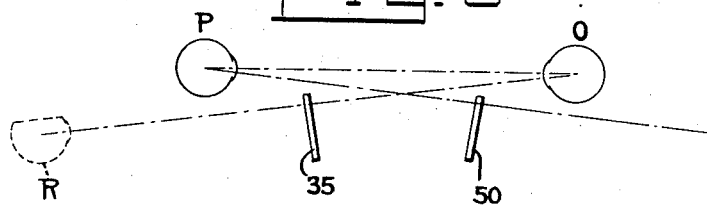
INVENTOR
GEORGE SWIKART
BY
Bohleber & Ledbetter
ATTORNEYS Patented Oct. 10, 1933

1,929,525

UNITED STATES PATENT OFFICE 1,929,525

INTERCENTRIC GAUGE

George Swikart, Riverdale, N. Y.

Application June 20, 1932. Serial No. 618,122

15 Claims. (Cl. 88—20)

The invention pertains to an intercentric gauge adapted to accurately measure the distance between the centers of rotation of a pair of human eyes. It is very important, particularly in the fitting of eyeglasses having bifocal lenses, that the spacing of the lenses of the eyeglasses coincides exactly with the spacing between the centers of rotation of the pair of eyes being fitted. The instrument to be described herein is capable of measuring what is commonly termed the interpupillary measurement more precisely and more easily than this measurement has been obtained by instruments now available.

Many instruments have been devised which measure the interpupillary distance of the eyes which distance may not be the distance between the centers of rotation of the pair of eyes being fitted. The reason for this failure to measure the distance between the centers of rotation of the eyes lies in the fact that the patient is instructed to fix his gaze upon an object relatively near. With the eyes fixed upon such relatively near object, the pupillary distance is less than the distance between the centers of rotation of the eyes. This is understandable when it is remembered that each eye focuses directly upon the object and hence the distance between the centers of the pupils of the eyes would represent the base of a triangle whose apex is at the object, as compared with the base of a triangle whose ends represent the centers of rotation of the eyes. The latter triangle would be a triangle having the same angles as the first triangle, but its altitude would be greater so that its base consequently is also greater than the base of the first triangle having the lesser altitude. The base of the first triangle would be the interpupillary measurement, whereas the base of the second triangle would be intercentric measurement between the centers of rotation of the pair of eyes.

An object of the invention is to devise a novel intercentric gauge to measure accurately the distance between the centers of rotation of a pair of eyes.

Another object of the invention is to construct a novel intercentric gauge which accurately measures the distance between the centers of rotation of a pair of eyes and which enables this measurement to be taken quickly and easily.

More particularly, it is an object of the invention to devise an intercentric gauge of novel design in which the patient's vision of each eye is directed separately in parallel planes and accurately measuring the distance to the line of vision from the center of the gauge or instrument or from the corresponding and parallel line of vision of the other eye. This object is accomplished by the use of at least one mirror in which the eye of the observer is adapted to be reflected and the intercentric reading taken in a position in which the center of the pupil of the reflection of the observer's eye in the mirror is in direct vertical alignment with the center of the pupil of the eye of the patient.

Other objects of the invention will be more apparent from the following description, taken in connection with the accompanying drawings showing preferred embodiments of the invention, in which:

Figure 1 is a side elevational view of the intercentric gauge showing the manner of its use with respect to the patient on the left whose intercentric measurement is to be taken for fitting a pair of eyeglasses by the observer shown on the right.

Figure 2 is a top view looking down upon the intercentric gauge.

Figure 3 is an end view of the intercentric gauge as viewed from the observer's position or end of the gauge.

Figure 4 is a top diagrammatic illustration of the manner in which the true intercentric measurement of a pair of eyes is obtained.

Figure 5 is a side diagrammatic illustration of the manner in which the intercentric gauge or instrument obtains the true intercentric measurement of a pair of eyes.

Figure 6 is a view showing the position of the patient's eye and the reflection of the observer's eye in the mirror of the gauge in the position in which the true intercentric dimension of one of the eyes of the patient corresponds with the interpupillary dimension as observed by the observer when the scale reading is taken.

Figure 7 shows another form of the invention which differs from the construction shown in Figure 1 in utilizing two mirrors, whereas the gauge in Figure 1 uses one mirror.

Figure 8 is a diagrammatic illustration of the manner in which the true intercentric dimension of one or a pair of eyes is measured as viewed from the side of the gauge or instrument.

Figure 9 shows what the observer sees and the relative position of the patient's eye as compared with the reflection of the observer's eye in the mirror at the position in which they should appear at the time the reading is taken upon the scale for the true intercentric dimension of the patient's eye.

The intercentric gauge now to be described not only accurately measures the spacing between the centers of rotation of a pair of human eyes, but also enables that measurement to be made quickly and easily. The principle upon which the instrument operates in its simplest form, as shown in Figure 1, is to direct the vision of one of the eyes of the patient upon the eye of the observer at all times. A mirror is supported adjacent to the eye of the patient with its reflecting surface directed towards the observer. This mirror is placed upon a level substantially bisecting the pupil of the eye of the patient. The patient is instructed to keep his vision directly upon the eye of the observer at all times and the observer moves his eye laterally with respect to the instrument or parallel with respect to the mirror until the center of the reflection of his eye in the mirror lies in a vertical plane or line with the center of the pupil of the eye of the patient. In this position a scale reading is taken upon a scale preferably along the edge of a mirror. This procedure is followed separately for each eye.

When the pupil of the eye of the observer as reflected in the mirror is in the same vertical plane with the center of the pupil of the eye of the patient, the line of vision of both patient and observer is exactly perpendicular to the mirror. If then the vision of both eyes is directed in the same manner at the time the reading for each eye is made, the lines of vision must be parallel because they are both perpendicular to the same mirror. It is obvious, therefore, that when the vision of each eye is directed in parallel planes, the intercentric distance between the pupils of the eyes must correspond exactly with the distance between the centers of rotation of the eyes of the patient.

The gauge preferably utilizes a vertically disposed shield 10. The shield 10 serves also as a frame to support the other devices which are provided with the gauge in order to make the intercentric measurement. It is clear that the shield may be a simple frame without performing the function of shielding the vision of one eye of the patient, such as the right eye, from the vision of the right eye of the observer upon the other side of the frame or shield. The shield therefore assists in preventing the possibility of the patient's eye wandering from being directed to the left eye of the observer.

The shield 10 carries a nose rest 13 which preferably is a U-shaped or a modified U-shaped structure to fit over the bridge of the nose of the patient P. The nose rest 13 carries a vertical guide or slide 14 having a vertical slot 15 therein in which a pair of guide screws 16 are received. This construction provides vertical adjustability for the nose rest.

The slide or guide 14 is connected by a link 17 to an adjusting nut 18. The link 17 is pivotally mounted upon a pivot 23 in the bracket 19 carried by the shield 10 and the nut 18 is mounted upon a screw 22 also carried by the shield 10. The adjusting nut 18 carries a groove 20 in which rollers 21 upon the connecting link 17 is received. By rotating the adjusting nut 18, the nut moves vertically upon the screw 22, which vertical movement is transmitted by link 17 to the slide 14 and the nose rest 13 and thereby obtains vertical adjustment thereof.

The shield 10 carries a handle 25 for conveniently holding the intercentric gauge when it is being used. The handle 25 is preferably secured to the end of the screw 22, although it is clear that it may be provided at any desired point upon the gauge.

In order to steady the observer while he is taking a reading of the patient's intercentric dimension, a head rest 30 is provided upon the shield 10 at the end thereof opposite from the nose rest 13. The head rest is a transversely extending bar or plate supported upon the shield 10 by means of the brackets 31. This head rest extends at right angles to the shield 10. The observer rests his forehead upon the head rest 30 and moves or slides his head along its surface when obtaining vertical alignment between the center of the patients pupil and the center of the reflection of the observer's own eye in the mirror 35 as will be described.

A mirror 35 is carried upon the shield 10 at the end thereof adjacent to the nose rest 13 and is supported by a bracket 36 which holds the mirror at right angles to the shield 10. The reflecting surface of the mirror 35 faces the observer O. The mirror preferably is a single mirror which extends upon both sides of the shield 10. A scale 37, graduated usually in millimeters and centimeters, is provided at or adjacent the edge of the mirror 35 and may be etched into the surface of a glass mirror. The scale or graduations 37 may be one continuous scale or it may consist of two scales extending outwardly along the edge of the mirror from the center or shield 10. With the separate scales, as shown in Figure 3, the distance of each eye from the nose of the patient or the center of the gauge is obtained as a separate reading. The intercentric measurement between the centers of rotation of the patient's eyes will then be obtained by adding the scale readings for each eye.

In order to prevent the patient from being diverted and the eye to be measured from being influenced by the vision of the other eye, a screening means is utilized to obstruct the vision of the other eye. The screen 40 carried by the shield 10 is adapted to obstruct the vision of one eye only. Either eye may be obstructed merely by moving the screen 40 from one side to the other side of the shield 10. The movement of the screen 40 is obtained preferably by mounting the screen upon the pivot 41 which is supported on the shield 10 by means of the brackets 42. The shield 10 has a slot 43 therethrough so that the screen 40 is pivoted or movable through the slot into a position to screen either the left or the right eye of the patient. The screen 40 may have an outwardly bent stop 44 at each end of the screen, which stop engages the shield 10 when it has been fully pivoted into position to shield one or the other eye.

The manner in which the intercentric dimension of the patient's eyes is obtained is shown diagrammatically in Figures 4 and 5. The patient's left eye PL and the right eye PR are shown adjacent to the mirror 35 and parallel thereto. The vision of the patient is directed over the mirror 35 while the vision of the left eye PL is obstructed by the screen 40. The observer's right eye OR and the left eye OL are shown with their vision directed towards the patient's eyes and parallel with the mirror 35. The vision of the observer's right eye OR is obstructed by the screen 40 in the same way that the vision of the patient's left eye PL is also screened thereby.

The patient is instructed to direct the vision of his right eye PR directly upon the left eye OL of the observer. The observer O moves his head until the reflection R of his left eye OL is in vertical alignment with the patient's right eye PR. This position is shown in Figure 6 where the center of the pupil of the eye of the patient as observed by the observer's left eye OL is the true intercentric measurement of the patient's right eye PR. In this position the vision of the patient's right eye PR is being directed parallel to the shield 10 and perpendicular to the mirror 35 in which position the center of the pupil of the patient's right eye PR is in direct line with the center of rotation of the right eye so that a reading of the center of the pupil from the screen 10 will correspond with and also be the reading of the intercentric dimension of the center of rotation of the right eye PR.

The same procedure is followed in reading the intercentric dimension of the patient's left eye PL. Before this reading or measurement is taken, the screen 40 will be rotated to the other side of the shield 10 to obstruct the vision of the patient's right eye PR and to clear the vision of the patient's left eye PL.

A side view of the position of the eyes and the position of the mirror is shown in Figure 5. The mirror 35 is shown with its top edge substantially bisecting the view of the patient's right eye in a horizontal plane. By this construction the graduations of the scale 37 upon the upper edge of the mirror 35 are brought directly to the center of the pupil of the patient's eye PR so that the center of the pupil may be exactly and easily determined to measure the intercentric dimension of the patient's eye. The mirror 35 with its scale 37 need not, of course, be so positioned, but may be somewhat below the horizontal center of the patient's eye. Where the edge of the mirror is below the horizontal center of the patient's eye, it is not quite as simple to align the center of the pupil of the eye with a graduation upon the edge of the scale but this does not prevent an accurate dimension from being read. The reading is not at all difficult to make, as shown in Figure 9, when the center of the eye is somewhat above the edge of the mirror 35.

As discussed above, the true intercentric dimension between the centers of rotation of a patient's eyes will be obtained by adding the reading of the interpupillary dimensions obtained for the patient's right eye PR and for the patient's left eye PL. This will be the true intercentric dimension of the center of rotation of the patient's eyes because with the vision of the patient's eyes directed perpendicularly to the mirror 35 when the scale reading is taken separately for each eye, the vision of each eye is parallel to the other and hence the intercentric dimension of the pupils of the eyes of the patient is the same as the intercentric dimension of the centers of rotation of the eyes.

In Figure 7 a modified construction is shown which corresponds essentially in every detail with the construction shown in Figure 1. One of the differences in this construction is that the mirror 35 is tilted slightly so that its reflecting surface is directed at a slight angle upwardly. The reason for this tilting will be discussed more fully hereinafter.

A second mirror 50 is also provided in the construction shown in Figure 7, which mirror is carried by the shield 10 adjacent to the eye of the observer O. This mirror is supported upon the shield 10 by a bracket 51 which holds the mirror 50 at right angles to the shield 10 and with an upward tilt at a slight angle. The reflecting surface of the mirror 50 is directed towards the patient P and hence the slight tilt in the mirror directs the reflecting surface at a slight tilt upwardly. In all other respects, the two constructions of Figures 1 and 7 are identical.

With the gauge shown in Figure 7, the patient P is instructed to direct the vision of the eye to be measured upon the mirror 50 so that he is looking directly at the reflection of his own eye therein. With the patient's vision so directed, then the vision of that eye is perpendicular to the mirror 50 and hence is parallel to the shield 10. The observer O now moves his head along the head rest 30 until the reflection of the observer's eye in the mirror 35 is in vertical alignment with the patient's eye as shown in Figure 9. In this position the vision of the observer is perpendicular to the mirror 35 and hence parallel to the screen 10 and in the same plane as the vision of the patient. The reading upon the scale 37 of the graduation which bisects the center of the patient's pupil is also the true intercentric dimension of the center of rotation of the patient's eye. The intercentric reading of a patient's eyes is taken essentially in the same manner with the gauge of Figure 7 as with the gauge of Figure 1 and the only difference is in the patient directing his vision upon a mirror rather than upon the observer's eye.

A diagrammatic illustration of the position of the patient's eye P and the observer's eye O is shown in Figure 8 and the reflection R of the observer's eye in the mirror 35, shown in dotted lines at the left of the illustration, as well as the reflection R of the patient's eye in the mirror 50 shown in dotted lines at the right of the illustration. The vertical alignment of the center of the patient's eye PR and of the reflection R of the observer's eye in the mirror 35 is shown in Figure 9.

Various modifications will occur to those skilled in the art in the configuration, composition and disposition of the component elements going to make up the invention as a whole, as well as in the selective combination or application of the respective elements, and no limitation is intended by the phraseology of the foregoing description or illustrations in the accompanying drawings, except as indicated in the appended claims.

What is claimed is:

1. An intercentric gauge comprising a frame, a nose rest carried thereby, a mirror carried by the frame and extending at right angles thereto, the mirror facing away from the nose rest and being spaced vertically therefrom so that the eye of the patient is adjacent the edge of the mirror, the plane of the mirror being disposed substantially vertically so that an observer will see his eye therein when taking an intercentric reading, and a scale along the edge of the mirror.

2. An intercentric gauge comprising a frame, a nose rest carried thereby, a mirror carried by the frame and extending at right angles thereto, the mirror facing away from the nose rest, the plane of the mirror being disposed substantially vertically so that an observer will see his eye therein when taking an intercentric reading, a scale along the edge of the mirror, and means adjusting the position of the nose rest vertically relatively to the mirror to bring the eye of the patient adjacent the edge of the mirror.

3. An intercentric gauge comprising a fixed central shield, a nose rest carried at the end of the shield, a mirror carried by the shield and extending at right angles thereto, the mirror facing away from the nose rest and being spaced vertically therefrom so that the eye of the patient is adjacent the edge of the mirror, the plane of the mirror being disposed substantially vertically so that an observer will see his eye therein when taking an intercentric reading, and a scale along the edge of the mirror.

4. An intercentric gauge comprising a fixed central shield, a nose rest carried at the end of the shield, a mirror carried by the shield adjacent the end thereof and extending at right angles thereto, the plane of the mirror being disposed substantially vertically so that an observer will see his eye therein when taking an intercentric reading, a scale along the edge of the mirror, and means adjusting the position of the nose rest vertically relatively to the mirror to bring the eye of the patient adjacent the edge of the mirror.

5. An intercentric gauge comprising a fixed central shield, a nose rest carried at the end of the shield, a mirror, carried by the frame and extending outwardly from both sides of and at right angles to the shield, the plane of the mirror being disposed substantially vertically so that an observer will see his eye therein when taking an intercentric reading, a scale along the edge of the mirror, and a screen upon one side of the shield to obstruct the vision of one eye and movable to the other side of the screen to obstruct the vision of the other eye and clear the vision of the first eye.

6. An intercentric gauge comprising a central frame, a nose rest carried at one end thereof, a mirror carried by the frame and extending at right angles thereto and to the nose rest, the mirror being spaced vertically from the nose rest so that the eye of the patient is adjacent the edge of the mirror, the plane of the mirror being disposed substantially vertically so that an observer will see his eye therein when taking an intercentric reading, a scale along the edge of the mirror, and a head rest at the other end of the frame from the nose rest and extending at right angles to the frame.

7. An intercentric gauge comprising a central frame, a nose rest carried at one end thereof, a mirror carried by the frame adjacent the end thereof and extending at right angles to the frame, the mirrored surface facing the other end of the frame, the plane of the mirror being disposed substantially vertically so that an observer will see his eye therein when taking an intercentric reading, a scale along the edge of the mirror, and a second mirror at the other end of the frame having its mirrored surface facing towards the other mirror.

8. An intercentric gauge comprising a central and vertically disposed shield, a nose rest at one end thereof, a vertical guide carrying the nose rest, a handle projecting downwardly from the shield, screw threads on the handle, a nut on the screw threads, means operably connecting the nut with the nose rest for vertical adjustment of the latter, a mirror carried by the shield adjacent the end thereof and extending at right angles to the shield, the mirrored surface facing toward the other end of the shield, and a scale along the edge of the mirror.

9. An intercentric gauge comprising a central and vertically disposed shield, a nose rest at one end thereof, a mirror carried by the shield adjacent the end thereof carrying the nose rest and extending at right angles to the shield, the mirrored surface facing toward the other end of the shield, the plane of the mirror being disposed substantially vertically so that an observer will see his eye therein when taking an intercentric reading, a scale along the edge of the mirror, and a second mirror at the other end of the shield having its mirrored surface facing toward the other mirror.

10. An intercentric gauge comprising a central frame, a nose rest at one end thereof, means supporting the nose rest for vertical adjustment, a mirror carried by the frame adjacent the end thereof carrying the nose rest and extending at right angles to the frame, the mirrored surface facing toward the other end of the frame, the plane of the mirror being disposed substantially vertically so that an observer will see his eye therein when taking an intercentric reading, a scale along the edge of the mirror, and a second mirror at the other end of the frame having its mirrored surface facing toward the other mirror.

11. An intercentric gauge comprising a central and vertically disposed shield, a nose rest at one end thereof, means supporting the nose rest for vertical adjustment, a mirror carried by the shield adjacent the end thereof carrying the nose rest and extending at right angles to the shield, the mirrored surface facing toward the other end of the shield, the plane of the mirror being disposed substantially vertically so that an observer will see his eye therein when taking an intercentric reading, a scale along the edge of the mirror, and a second mirror at the other end of the shield having its mirrored surface facing toward the other mirror.

12. An intercentric gauge comprising a central frame, a nose rest at one end thereof, a screen obstructing the vision of one eye and movable into position to obstruct the vision of the other eye and clear the vision of the first eye, a mirror carried by the frame adjacent the end thereof and extending at right angles to the frame, the mirrored surface facing toward the other end of the frame, the plane of the mirror being disposed substantially vertically so that an observer will see his eye therein when taking an intercentric reading, a scale along the edge of the mirror, and a second mirror at the other end of the frame having its mirrored surface facing toward the other mirror.

13. An intercentric gauge comprising a central and vertically disposed shield, a vertically adjustable nose rest at one end thereof, a mirror carried by the shield adjacent the end thereof and extending at right angles to the shield, the mirrored surface facing toward the other end of the shield and tilted upward at a slight angle, a scale along the edge of the mirror, a second mirror at the other end of the shield having its mirrored surface facing toward the other mirror and tilted upward at a slight angle, a slot in the shield, and a screen pivoted in the slot and swingable into position to obstruct the vision of either eye.

14. An intercentric gauge comprising a central and vertically disposed shield, a nose rest at one end thereof, a vertical slide carrying the nose rest, a handle attached to the shield, screw threads on the handle, a nut on the screw threads, means connecting the nut and the nose rest for vertical adjustment of the latter, a vertically disposed mirror carried by the shield adjacent the end thereof and extending at right angles to the shield, the mirrored surface facing toward the other end of the shield and tilted upward at a slight angle, a scale along the edge of the mirror, a second mirror at the other end of the shield having its mirrored surface facing toward the other mirror and tilted upward at a slight angle, a slot in the shield, a screen carried by the shield in the slot and obstructing the vision of one eye, means mounting the screen for movement through the slot to a position obstructing the vision of the other eye, and a head rest extending horizontally and at right angles to the shield and carried thereby at the other end thereof from the nose rest.

15. An intercentric gauge comprising a fixed central shield, a nose rest carried at the end of the shield, a mirror carried by the shield and extending at right angles thereto, the mirror facing away from the nose rest, the plane of the mirror being disposed substantially vertically so that an observer will see his eye therein when taking an intercentric reading, and a scale along the edge of the mirror.

GEORGE SWIKART.